United States Patent
Butterfield et al.

(10) Patent No.: US 10,397,214 B2
(45) Date of Patent: Aug. 27, 2019

(54) COLLABORATIVE SIGN-ON

(71) Applicant: International Business Machines Corporation, Armonk, NY (US)

(72) Inventors: Daniel J. Butterfield, Flower Mound, TX (US); Tsz S. Cheng, Grand Prairie, TX (US); Gregory P. Fitzpatrick, Keller, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/914,914

(22) Filed: Mar. 7, 2018

(65) Prior Publication Data

US 2018/0198778 A1  Jul. 12, 2018

Related U.S. Application Data (63) Continuation of application No. 14/691,248, filed on Apr. 20, 2015, now Pat. No. 9,954,846.

(51) Int. Cl.
*G06F 17/00* (2019.01)
*H04L 29/06* (2006.01)

(52) U.S. Cl.
CPC .......... *H04L 63/0815* (2013.01); *H04L 63/08* (2013.01)

(58) Field of Classification Search
CPC ........................... H04L 63/0815; H04L 63/08
See application file for complete search history.

(56) References Cited

U.S. PATENT DOCUMENTS

| 7,117,359 | B2 | 10/2006 | Wood et al. |
| 7,356,694 | B2 | 4/2008 | Mayo et al. |
| 7,987,501 | B2 | 7/2011 | Miller et al. |
| 2005/0097049 | A1* | 5/2005 | Writer ............... G06Q 20/00 705/44 |

(Continued)

OTHER PUBLICATIONS

Encheva, S. et al., "Enterprise Logon Server for Domain WideWeb-Based Applications," In Proceedings of the 7th WSEAS International Conference on Circuits, Systems, Electronics, Control and Signal Processing (CSECS'08), World Scientific and Engineering Academy and Society, 2008, pp. 36-39.

(Continued)

*Primary Examiner* — Trong H Nguyen
*Assistant Examiner* — Amie C. Lin
(74) *Attorney, Agent, or Firm* — Cuenot, Forsythe & Kim, LLC (57) ABSTRACT

An authentication approval request can be received by a first system from a second system. The first system can determine whether the user is required to be logged into at least a second online account hosted by at least a third system unrelated to the second system in order to approve the authentication request. If the user is required to be logged into at least the second online account in order to approve the authentication request, the first system can determine whether the user presently is logged into at least the second online account in at least one presently active user session. If the user presently is logged into at least the second online account in at least one presently active user session, the first system can communicate to the second system a response indicating that the user is approved for authentication with the second system.

15 Claims, 3 Drawing Sheets

(56) References Cited

U.S. PATENT DOCUMENTS

| | | | |
|---|---|---|---|
| 2005/0177732 A1* | 8/2005 | Flom | H04L 51/04 |
| | | | 713/182 |
| 2008/0086764 A1* | 4/2008 | Kulkarni | G06F 21/33 |
| | | | 726/7 |
| 2012/0210413 A1 | 8/2012 | Akula et al. | |
| 2014/0181944 A1 | 6/2014 | Ahmed et al. | |
| 2014/0215551 A1* | 7/2014 | Allain | H04L 63/10 |
| | | | 726/1 |
| 2014/0245407 A1* | 8/2014 | Vernal | G06F 21/41 |
| | | | 726/5 |
| 2014/0259134 A1 | 9/2014 | Scavo et al. | |
| 2016/0269396 A1* | 9/2016 | Ren | H04W 12/06 |
| 2016/0308853 A1 | 10/2016 | Butterfield et al. | |

OTHER PUBLICATIONS

Alam, M. et al., "Mauth: A Fine-Grained and User-Centric Permission Delegation Framework for Web Services," International Journal of Physical Sciences 6, No. 8, 2011, pp. 2060-2071.

* cited by examiner

302 Responsive to a user providing at least one authentication credential to a second system during an attempt to log into a first online account hosted by the second system, receive, by a first system comprising at least one processor, an authentication approval request from the second system

304 Responsive to receiving the authentication approval request from the second system, determine, by the first system, whether the user is required to be logged into at least a second online account hosted by at least a third system unrelated to the second system in order to approve the authentication request

306 Responsive to determining that the user is required to be logged into at least the second online account hosted by at least the third system in order to approve the authentication request, determine, by the first system, whether the user presently is logged into at least the second online account hosted by at least the third system in at least one presently active user session

308 Is the user presently logged into at least the second online account hosted by at least the third system in at least one presently active user session?

Yes → 310 Communicate to the second system a response to the authentication approval request indicating that the user is approved for authentication with the second system to log into the first online account hosted by the second system No → 312 Communicate to the second system a response to the authentication approval request indicating that the user is not approved for authentication with the second system to log into the first online account hosted by the second system

FIG. 3

COLLABORATIVE SIGN-ON

BACKGROUND

The present invention relates to Internet security, and more specifically, to providing secure access to online accounts.

The security of account access via the Internet is a key concern for organizations that provide sensitive business services online. As widely reported in the media, user account information is regularly stolen by unscrupulous people using various malicious methods and activities. For example, a user may receive a phishing e-mail, which seemingly appears to be from his/her bank, asking the user to change his/her password due to recent and well publicized security breach. The phishing e-mail typically will provide a spoof link which appears to be a hyperlink to the user's bank, but in actuality is a hyperlink to a malicious website configured to look like the website of the user's bank. If the user selects the spoof link and provides his/her user ID and password to access the website, the user ID and password are then stolen by the website. Operators of such malicious websites typically use the stolen user ID and password to access the user's actual bank account, or sell the stolen user ID and password to other unscrupulous people who intend to do the same.

SUMMARY

A method includes, responsive to a user providing at least one authentication credential to a second system during an attempt to log into a first online account hosted by the second system, receiving, by a first system including at least one processor, an authentication approval request from the second system. The method also includes, responsive to receiving the authentication approval request from the second system, determining, by the first system, whether the user is required to be logged into at least a second online account hosted by at least a third system unrelated to the second system in order to approve the authentication request. The method also includes, responsive to determining that the user is required to be logged into at least the second online account hosted by at least the third system in order to approve the authentication request, determining, by the first system, whether the user presently is logged into at least the second online account hosted by at least the third system in at least one presently active user session. The method also includes, responsive to determining that the user presently is logged into at least the second online account hosted by at least the third system in at least one presently active user session, communicating to the second system a response to the authentication approval request indicating that the user is approved for authentication with the second system to log into the first online account hosted by the second system.

A first system includes a processor programmed to initiate executable operations. The executable operations include, responsive to a user providing at least one authentication credential to a second system during an attempt to log into a first online account hosted by the second system, receiving, by the first system, an authentication approval request from the second system. The executable operations also include, responsive to receiving the authentication approval request from the second system, determining, by the first system, whether the user is required to be logged into at least a second online account hosted by at least a third system unrelated to the second system in order to approve the authentication request. The executable operations also include, responsive to determining that the user is required to be logged into at least the second online account hosted by at least the third system in order to approve the authentication request, determining, by the first system, whether the user presently is logged into at least the second online account hosted by at least the third system in at least one presently active user session. The executable operations also include, responsive to determining that the user presently is logged into at least the second online account hosted by at least the third system in at least one presently active user session, communicating to the second system a response to the authentication approval request indicating that the user is approved for authentication with the second system to log into the first online account hosted by the second system.

A computer program includes a computer readable storage medium having program code stored thereon. The program code is executable by a processor to perform a method. The method includes, responsive to a user providing at least one authentication credential to a second system during an attempt to log into a first online account hosted by the second system, receiving, by a first system including the processor, an authentication approval request from the second system. The method also includes, responsive to receiving the authentication approval request from the second system, determining, by the first system, whether the user is required to be logged into at least a second online account hosted by at least a third system unrelated to the second system in order to approve the authentication request. The method also includes, responsive to determining that the user is required to be logged into at least the second online account hosted by at least the third system in order to approve the authentication request, determining, by the first system, whether the user presently is logged into at least the second online account hosted by at least the third system in at least one presently active user session. The method also includes, responsive to determining that the user presently is logged into at least the second online account hosted by at least the third system in at least one presently active user session, communicating to the second system a response to the authentication approval request indicating that the user is approved for authentication with the second system to log into the first online account hosted by the second system.

BRIEF DESCRIPTION OF THE DRAWINGS

FIG. 3 is a flow chart illustrating an example of a method of providing collaborative sign-on.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention relates to Internet security, and more specifically, to providing secure access to online accounts. In accordance with the inventive arrangements disclosed herein, a collaborative sign-on (CSO) process is implemented to provide secure access to online accounts. In the CSO process, a user may attempt to log into a particular online account, for example a banking account. As part of the authentication procedure to log the user into the online account, a CSO system can determine whether the user is presently logged into at least one other online account, for example an e-mail account, a social networking system or an electronic commerce (E-commerce) system, unrelated to the online account the user is attempting to log into. If the user is not logged into the other online account in a presently active user session (e.g., a user session that is presently indicated as being active and/or idle), user authentication with the particular online account can be denied. If, however, the user is logged into the other online account in a presently active user session, user authentication can be approved, assuming the user provided authentication credential(s) is/are correct. Of course, if the user provided authentication credential(s) is/are not correct, user authentication can be denied.

Several definitions that apply throughout this document now will be presented.

As defined herein, the term "online account" means an account associated with a user which the user accesses via the Internet by authenticating with a system hosting the account. For example, the user may access an "online account" by accessing a web page hosted by the system and providing authentication credentials to the system. Once authenticated, the user is able to access one or more other web pages hosted by the system that provide and/or receive information relevant to the "online account."

As defined herein, the term "authentication credential" means information provided by a user to a system for user authentication with the system. Examples of an authentication credential include, but are not limited to, a user identifier, a password, a passcode, a biometric input, a user authentication file assigned to particular user, and the like. Examples of a biometric input include, but are not limited to, a finger print, a retinal scan, and the like.

As defined herein, the term "authentication approval request" means a request sent by a system inquiring whether a user is authorized to be authenticated with the system.

As defined herein, the term "logged into" means having been authenticated for a presently active user session.

As defined herein, the term "presently active user session" means a presently established user session with an online account wherein the session state of the user session presently is indicated as being active and/or idle. A user session that is indicated as being disconnected, terminated or closed is not a "presently active user session" in the context of the arrangements described herein.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

Figure 1:
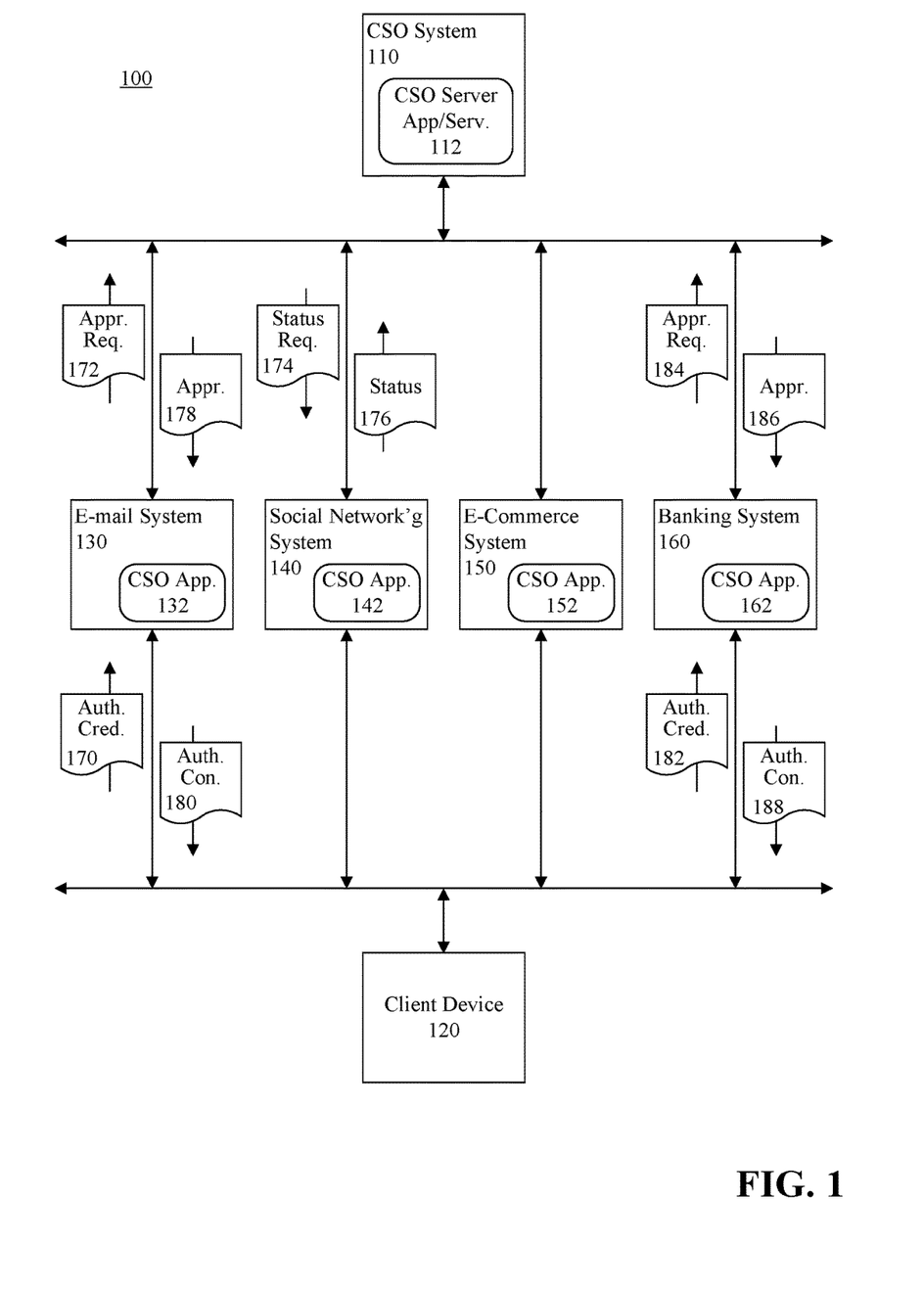
FIG. 1 is a block diagram illustrating an example of a communication system.

FIG. 1 is a block diagram illustrating an example of a communication system 100. The communication system 100 can include a collaborative sign-on (CSO) system 110. The CSO system 110 can include a CSO server application and/service (hereinafter "CSO server application") 112 configured to provide CSO for users accessing various online accounts as described herein.

Figure 2:
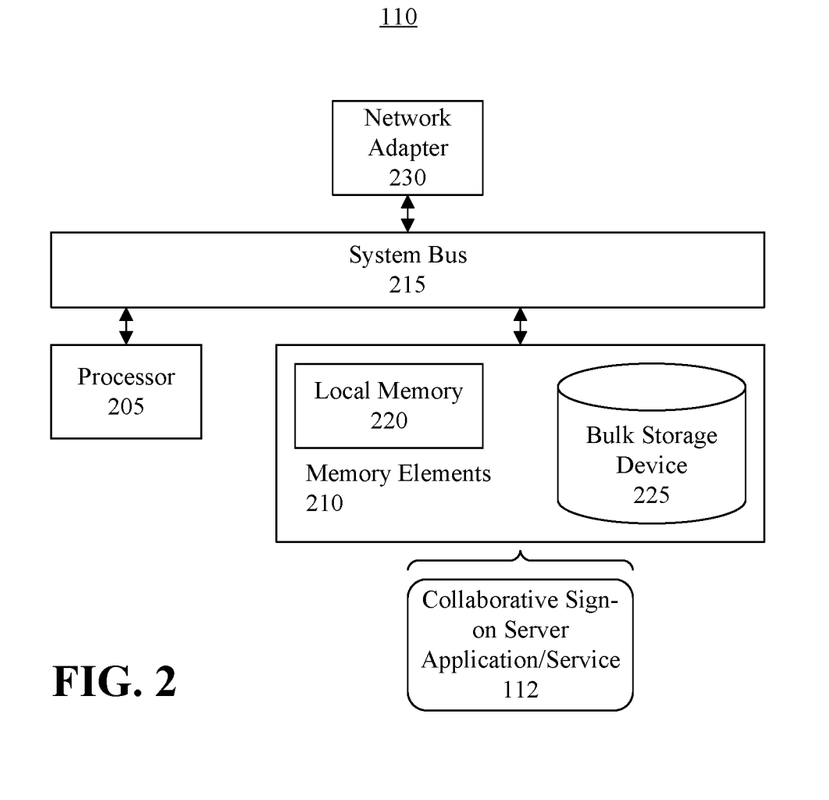
FIG. 2 is a block diagram illustrating example architecture for a collaborative sign-on system.

FIG. 2 is a block diagram illustrating example architecture for the CSO system 110. The CSO system 110 can include at least one processor 205 (e.g., a central processing unit) coupled to memory elements 210 through a system bus 215 or other suitable circuitry. As such, the CSO system 110 can store program code within the memory elements 210. The processor 205 can execute the program code accessed from the memory elements 210 via the system bus 215. It should be appreciated that the CSO system 110 can be implemented in the form of any system including a processor and memory that is capable of performing the functions and/or operations described within this specification. For example, the CSO system 110 can be implemented as a computer, such as a server, or as a plurality of computers that are communicatively linked.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The CSO system 110 also can include one or more cache memories (not shown) that provide temporary storage of at least some program code in order to reduce the number of times program code must be retrieved from the bulk storage device 225 during execution.

Input/output (I/O) devices, for example one or more network adapters 230, can be coupled to CSO system 110 to enable the CSO system 110 to become coupled to other systems, computer systems, remote printers, and/or remote storage devices through intervening private or public networks. Modems, cable modems, transceivers, and Ethernet cards are examples of different types of network adapters 230 that can be used with the CSO system 110.

As pictured in FIG. 2, the memory elements 210 can store the components of the CSO system 110, namely the CSO server application 112. The CSO server application 112 can be configured to, when executed by the processor 205, perform the various processes described herein as being performed by the CSO system 110. Being implemented in the form of executable program code, the CSO server application 112 can be executed by the CSO system 110 and, as such, can be considered part of the CSO system 110. Moreover, the CSO server application 112 is a functional data structure that imparts functionality when employed as part of the CSO system 110.

Referring again to FIG. 1, the communication system 100 also can include at least one client device 120. The client device 120 can be a processing system, including at least one processor and one or more memory elements, configured to access one or more other systems 130, 140, 150, 160 via one or more communication networks. Examples of the client device 120 include, but are not limited to, a computer, a desktop computer, a personal computer, a workstation, a laptop computer, a tablet computer, a netbook computer, a mobile computer, a smart phone, a personal digital assistant, and the like. A communication network is the medium used to provide communications links between various devices and systems connected together within the communication system 100. A communication network may include connections, such as wire, wireless communication links, or fiber optic cables. A communication network can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

The systems 130-160 can be systems, each comprising at least one processor and memory elements, which host on-line accounts accessed by a user of the client device 120. Various examples of the systems 130-160 which may be accessed by the client device 120 include, but are not limited to, an electronic mail (e-mail) system 130, a social networking system 140, an electronic commerce (e-commerce) system 150 and a banking system 160. The user can access the on-line accounts using the client device 120. The systems 130-160 can be unrelated to one another. For example, the systems 130-160 can be hosted in different domains, etc. Other than through use of the CSO system 110, the systems 130-160 need not exchange information among one another. In the context of the arrangements described herein, systems that are hosted in the same domain are not to be considered unrelated. For example, an e-mail system and a text messaging system hosted in the same domain are not to be considered unrelated.

Each of the systems 130-160 can be configured to access the CSO system 110 during processes of authenticating a user of the client device 120 with the respective systems 130-160. For example, a respective copy and/or version of a CSO application, service or plugin (hereinafter "CSO application") 132, 142, 152, 162 can be installed on the respective systems 130-160. Each copy and/or version of the CSO application 132-162 can be executed by the respective systems 130-160 to facilitate CSO on the respective systems 130-160.

In order to access an on-line account, the user can provide one or more authentication credentials to each system 130-160 hosting an on-line account the user is attempting to access. Examples of the authentication credentials include, but are not limited to, a user identifier, a password, a passcode, a biometric input, a user authentication file assigned to the user, and/or the like. The user can manually enter the authentication credential(s) via the client device 120, select the authentication credential(s) from a storage location to communicate to the system 130-160 being accessed, or configure the client device 120 to automatically communicate the authentication credential(s) in response to the user accessing the system 130-160. For example, the user can store a user identifier and password in a web browser or other client application used by the user to access a system 130-160, and the a web browser or other client application can be configured to provide the user identifier and password to the system 130-160 in response to the user accessing the system 130-160.

By way of example, in response to the user accessing the e-mail system 130 to log into an online account (e.g., e-mail account) established for the user with the e-mail system, the e-mail system 130 can prompt the user and/or client device 120 to provide authentication credentials 170. In response, the authentication credentials 170 can be communicated from the client device 120 to the e-mail system 130. Responsive to receiving the authentication credentials 170, the e-mail system 130 can authenticate the authentication credentials. If the authentication credentials are not authenticated (e.g., a user name, password and/or authorization credential(s) is/are incorrect), the e-mail system 130 can deny access by the user to the e-mail system 130. If, however, the authentication credential(s) is/are correct, the e-mail system 130 (e.g., the CSO application 132) can communicate to the CSO system 110 an approval request 172 (e.g., a log-in approval request). The approval request 172 can include information indicating a CSO account established for the user with the CSO system 110 (e.g., with the CSO server application 112) and information identifying the user. In one arrangement, the approval request 172 can include the authentication credentials 170, though this need not be the case.

Responsive to receiving the approval request 172, the CSO server application 112 can determine whether the user is required to be logged into one or more other online accounts established for the user with the systems 140-160 in order to log into the e-mail account. For example, the CSO server application 112 can access log-in rules established for the user and process these log-in rules to determine whether the user is required to be logged into the other one or more other online accounts in order to log into the e-mail account.

If the user is required to be logged into one or more other online accounts, the CSO server can send a log-in status request message requesting the user's log-in status to each of the systems 140-160 hosting the online accounts for which the user is required to be logged into. For example, if the user is required to be logged into an online account hosted by the social networking system 140 in a presently active user session in order to log into the e-mail account, the system can communicate a log-in status request message to the social networking system 140. In response, the social networking system 140 can communicate a log-in status message 176 to the CSO system 110 indicating whether the user presently is logged into the user's online account hosted by the social networking system 140 in a presently active user session.

In another arrangement, to determine whether the user is presently logged into one or more other of the user's online accounts, the CSO server application 112 can access a data structure, such as a data table or the like, stored to memory elements, used to track the user's login status for each of the user's online accounts hosted by the systems 130-160. The data structure can indicate whether the user is presently logged into any of such online accounts and, if so, which of the online accounts the user presently is logged into in a presently active user session. The CSO server application 112 can process data accessed from the data structure to determine whether the user is presently logged into one or more of the other online accounts.

If the user is not presently logged into one or more online accounts which the user is required to be logged into in order to be authorized to log into the e-mail system 130, the CSO server application 112 can deny authorization for the user to log into the e-mail account and communicate a corresponding response (e.g., log-in denial) to the authentication approval request to the e-mail system 130 (e.g., to the CSO application 132). The response can be a an denial message (not shown) indicating that the user is not approved for authentication with the e-mail system 130 to log into the user's e-mail account hosted by the e-mail system 130. Responsive to receiving such message, the e-mail system 130 can deny the attempt by the user to log into the user's e-mail account, and communicate a message (not shown) to the client device 120 denying the attempt by the user to log into the e-mail account.

If, however, the user is not required to be logged into one or more other online accounts, or the user presently is logged into one or more other online accounts which the user is required to be logged into in order to log into the user's e-mail account, the CSO server application 112 can authorize the user to log into the user's e-mail account and communicate a corresponding response (e.g., log-in approval) to the authentication approval request to the e-mail system 130 (e.g., to the CSO application 132). The response can be a an approval message 178 indicating that the user is approved for authentication with the e-mail system 130 to log into the user's e-mail account hosted by the e-mail system 130. Responsive to receiving the approval message 178, the e-mail system 130 can complete the log-in process for the user to log the user into the user's e-mail account. The e-mail system 130 can communicate to the client device 120 an authentication confirmation 180 indicating that the user is logged into the e-mail system 130. Accordingly, the user can be provided access to use the e-mail system 130.

Further, in one aspect, responsive to authorizing the user to log into the e-mail account, or receiving a message from the e-mail system 130 indicating that the user presently is logged into the e-mail account, the CSO server application 112 can update the data structure to indicate that the user is logged into the e-mail account in a presently active user session. If the user is logged out of the e-mail system 130, by the user closing an e-mail client or web browser being used to access the e-mail account application, signing off of the user session, or the user session timing out, the e-mail system 130 (e.g., the CSO application 132) can communicate to the CSO server application 112 a message (not shown) indicating that the user is not logged into the e-mail account in a presently active user session. Responsive to receiving such message, the CSO server application 112 can update the data structure to indicate that the user is not logged into the e-mail account in a presently active user session.

In one optional arrangement, the CSO server application 112 can periodically poll each of the systems 130-160 to inquire whether the user presently is logged into online accounts hosted by the respective systems 130-160 in a presently active user sessions. For example, the CSO server application 112 can periodically communicate inquiry messages the respective systems 130-160. Responsive to receiving the inquiry messages, the systems 130-160 can respond by communicating respective status messages indicating whether the user presently is logged into the respective online accounts. Responsive to receiving each of such messages, the CSO server application 112 can update the data structure being used to track which online accounts the user presently is logged into. In another optional arrangement, the CSO applications 132-162 can be configured to periodically send messages to the CSO server application 112 indicating a present log-in status of the user with the online accounts hosted by the respective systems 130-160.

Continuing with the previous example, the user also can attempt to log into other online accounts established for the user with other systems 140-160. The aforementioned process can be performed for each online account the user attempts to access. In illustration, the user can access an online financial account established for the user and hosted by the banking system 160. In response to the user accessing the banking system 160 to log into the online financial account, the banking system 160 can prompt the user and/or client device 120 to provide authentication credentials 182. In response, the authentication credentials 182 can be communicated from the client device 120 to the banking system 160. Responsive to receiving the authentication credentials 182, the banking system 160 can authenticate the authentication credentials. If the authentication credential(s) is/are correct, the banking system 160 (e.g., the CSO application 162) can communicate to the CSO system 110 an approval request 184. Again, the approval request 184 can include information indicating a CSO account established for the user with the CSO system 110 (e.g., with the CSO server application 112) and information identifying the user. In one arrangement, the approval request 184 can include the authentication credentials 182, though this need not be the case.

Responsive to receiving the approval request 184, the CSO server application 112 can determine whether the user is required to be logged into one or more other online accounts established for the user with the systems 130-150 in order to log into the financial account. If the user is required to be logged into one or more other online accounts, the CSO server can determine whether the user presently is logged into such other online account(s), for example as previously described. In this example, it is assumed that in order to access the financial account, the user is required to be logged into the online accounts hosted by the e-mail system 130 and social networking system 140 in presently active user sessions.

If the user is not presently logged into each of the user's online accounts hosted by the e-mail system 130 and social networking system 140 in presently active user sessions, the CSO server application 112 can deny authorization for the user to log into the financial account and communicate a corresponding response to the authentication approval request to the banking system 160 (e.g., to the CSO application 162). The response can be a an denial message (not shown) indicating that the user is not approved for authentication with the banking system 160 to log into the user's financial account hosted by the banking system 160. Responsive to receiving such message, the banking system 160 can deny the attempt by the user to log into the user's financial account and communicate to the client device 120 a message (not shown) denying the attempt by the user to log into the user's financial account.

If, however, the user presently is logged into each of the user's online accounts hosted by the e-mail system 130 and social networking system 140 in presently active user sessions, the CSO server application 112 can authorize the user to log into the user's financial account and communicate a corresponding response (e.g., log-in approval) to the authentication approval request to the banking system 160 (e.g., to the CSO application 162). The response can be an approval message 186 indicating that the user is approved for authentication with the banking system 160 to log into the user's financial account hosted by the banking system 160. Responsive to receiving the approval message 186, the banking system 160 can communicate to the client device 120 an authentication confirmation 188 indicating that the user is logged into the banking system 160. Accordingly, the user can be provided access to use the banking system 160 to manage the user's financial account.

In one arrangement, responsive to authorizing the user to log into the user's financial account, or receiving a message from the banking system 160 indicating that the user presently is logged into the e-mail account, the CSO server application 112 can update the data structure to indicate that the user is logged into the financial account in a presently active user session. Again, if the user is logged out of the banking system 160, the banking system 160 (e.g., the CSO application 162) can communicate to the CSO server application 112 a message (not shown) indicating that the user is not logged into the e-mail account in a presently active user session. Responsive to receiving such message, the CSO server application 112 can update the data structure to indicate that the user is not logged into the financial account in a presently active user session.

It should be noted that the conditions for authorizing user access to the various online accounts can be user configurable. The user can specify, with the CSO system 110, the requisite conditions for logging into each of the user's online accounts for which the user chooses to have account access managed by the CSO system 110. Further, the user can configure specific online accounts to interact with the CSO system 110 to manage user access.

In illustration, the user can create an account with the CSO system 110 (e.g., the CSO server application 112 and establish the log-in rules the CSO server application 112 applies to determine whether the user may log into various online accounts specified by the user. For example, in the user's account with the CSO system 110, the user can specify which online accounts for which the user chooses to have accessed managed by the CSO system 110. The user also can specify for which online accounts there is a requirement that the user be logged into one or more other online accounts in order to gain access. Moreover, the user can specify which of the other online accounts the user must be logged into in order to gain access to a particular account. For example, the user can specify that, for the user's e-mail account hosted by the e-mail system 130, the user need not be logged into any other online accounts in order to access that e-mail account. The user also can specify that, for the user's financial account hosted by the banking system 160, the user is required to be logged into the user's e-mail account hosted by the e-mail system 130, the user's social networking account hosted by the social networking system 140 and/or the user's account hosted by the e-commerce system 150.

For the online accounts for which the user chooses to have managed by the CSO system 110, the user can provide to the respective CSO applications 132-162 the user's CSO account information. Such information can include the user's authentication credential(s) for the CSO system 110. The user's authentication credential(s) can be used by the respective systems 130-160 to access the CSO system 110, and can be indicated in the approval requests 172, 184 communicated to the CSO system 110.

FIG. 3 is a flow chart illustrating an example of a method 300 of providing collaborative sign-on. At step 302, responsive to a user providing at least one authentication credential to a second system during an attempt to log into a first online account hosted by the second system, an authentication approval request from the second system can be received by a first system comprising at least one processor.

At step 304, responsive to receiving the authentication approval request from the second system, the first system can determine whether the user is required to be logged into at least a second online account hosted by at least a third system unrelated to the second system in order to approve the authentication request.

At step 306, responsive to determining that the user is required to be logged into at least the second online account hosted by at least the third system in order to approve the authentication request, the first system can determine whether the user presently is logged into at least the second online account hosted by at least the third system in at least one presently active user session.

Referring to decision box 308, if the user presently is logged into at least the second online account hosted by at least the third system in at least one presently active user session, the process can proceed to step 310. At step 310, a response to the authentication approval request can be communicated to the second system. The response can indicate that the user is approved for authentication with the second system to log into the first online account hosted by the second system.

Referring again to decision box 308, if the user presently is not logged into at least the second online account hosted by at least the third system in at least one presently active user session, the process can proceed to step 312. At step 312, a response to the authentication approval request can be communicated to the second system. The response can indicate that the user is not approved for authentication with the second system to log into the first online account hosted by the second system.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
responsive to a user providing at least one authentication credential to a second system during an attempt to log into a first online account hosted by the second system, receiving, by a first system comprising at least one processor, an authentication approval request from the second system;
responsive to receiving the authentication approval request from the second system, determining, by the first system, whether the user is required to be logged into at least a second online account hosted by at least a third system unrelated to the second system in order to approve the authentication approval request;
responsive to determining that the user is required to be logged into at least the second online account hosted by at least the third system in order to approve the authentication approval request, determining, by the first system, whether the user presently is logged into at least the second online account hosted by at least the third system in at least one presently active user session;
responsive to determining that the user presently is logged into at least the second online account hosted by at least the third system in at least one presently active user session, communicating to the second system a response to the authentication approval request indicating that the user is approved for authentication with the second system to log into the first online account hosted by the second system;
responsive to the user providing at least one authentication credential to a fourth system during an attempt to log into a third online account hosted by the fourth system, receiving, by the first system, a second authentication approval request from the fourth system;
responsive to receiving the second authentication approval request from the fourth system, determining, by the first system, whether the user is required to be logged into at least a fourth online account hosted by at least a fifth system unrelated to the fourth system in order to approve the second authentication approval request;
responsive to determining that the user is required to be logged into at least the fourth online account hosted by at least the fifth system in order to approve the authentication approval request, determining, by the first system, whether the user presently is logged into at least the fourth online account hosted by at least the fifth system in at least one presently active user session; and
responsive to determining that the user presently is not logged into at least the fourth online account hosted by the at least the fifth system in at least one presently active user session, communicating to the fourth system a response to the authentication approval request indicating that the user is not approved for authentication with the fourth system to log into the third online account hosted by the fourth system.

2. The method of claim 1, wherein determining, by the first system, whether the user is required to be logged into at least a second online account hosted by at least a third system unrelated to the second system in order to approve the authentication approval request comprises:
determining whether the user is required to be logged into at least a second online account hosted by at least a third system unrelated to the second system in order to approve the authentication approval request by accessing, by the first system, log-in rules established for the user and processing, by the first system, the log-in rules.

3. The method of claim 1, wherein determining, by the first system, whether the user presently is logged into at least the second online account hosted by at least the third system in at least one presently active user session comprises:
communicating, by the first system, a log-in status request message to at least the third system, the log-in status request requesting the user's log-in status with the third system; and
determining, by the first system, whether the user presently is logged into at least the second online account hosted by at least the third system in at least one presently active user session by receiving from at least the third system a login status message, the log-in status message indicating whether the user presently is logged into at least the second online account hosted by the third system in at least one presently active user session.

4. The method of claim 1, wherein determining, by the first system, whether the user presently is logged into at least the second online account hosted by at least the third system in at least one presently active user session comprises:
accessing, by the first system, a data structure stored to memory elements, the data structure tracking whether the user presently is logged into at least the second online account; and
determining, by the first system, whether the user presently is logged into at least the second online account hosted by at least the third system in at least one presently active user session by processing data accessed from the data structure.

5. The method of claim 1, wherein determining, by the first system, whether the user presently is logged into at least the second online account hosted by at least the third system in at least one presently active user session comprises:
periodically polling, by the first system, at least the third system to inquire whether the user presently is logged into at least the second online account hosted by at least the third system; and receiving, by the first system, status messages indicating whether the user presently is logged into at least the second online account hosted by at least the third system.

6. A first system, comprising:
a processor programmed to initiate executable operations comprising:
responsive to a user providing at least one authentication credential to a second system during an attempt to log into a first online account hosted by the second system, receiving, by the first system, an authentication approval request from the second system;
responsive to receiving the authentication approval request from the second system, determining, by the first system, whether the user is required to be logged into at least a second online account hosted by at least a third system unrelated to the second system in order to approve the authentication approval request;
responsive to determining that the user is required to be logged into at least the second online account hosted by at least the third system in order to approve the authentication approval request, determining, by the first system, whether the user presently is logged into at least the second online account hosted by at least the third system in at least one presently active user session;
responsive to determining that the user presently is logged into at least the second online account hosted by at least the third system in at least one presently active user session, communicating to the second system a response to the authentication approval request indicating that the user is approved for authentication with the second system to log into the first online account hosted by the second system;
responsive to the user providing at least one authentication credential to a fourth system during an attempt to log into a third online account hosted by the fourth system, receiving, by the first system, a second authentication approval request from the fourth system;
responsive to receiving the second authentication approval request from the fourth system, determining, by the first system, whether the user is required to be logged into at least a fourth online account hosted by at least a fifth system unrelated to the fourth system in order to approve the second authentication approval request;
responsive to determining that the user is required to be logged into at least the fourth online account hosted by at least the fifth system in order to approve the authentication approval request, determining, by the first system, whether the user presently is logged into at least the fourth online account hosted by at least the fifth system in at least one presently active user session; and
responsive to determining that the user presently is not logged into at least the fourth online account hosted by the at least the fifth system in at least one presently active user session, communicating to the fourth system a response to the authentication approval request indicating that the user is not approved for authentication with the fourth system to log into the third online account hosted by the fourth system.

7. The first system of claim 6, wherein determining, by the first system, whether the user is required to be logged into at least a second online account hosted by at least a third system unrelated to the second system in order to approve the authentication approval request comprises:

determining whether the user is required to be logged into at least a second online account hosted by at least a third system unrelated to the second system in order to approve the authentication approval request by accessing, by the first system, log-in rules established for the user and processing, by the first system, the log-in rules.

8. The first system of claim 6, wherein determining, by the first system, whether the user presently is logged into at least the second online account hosted by at least the third system in at least one presently active user session comprises:
communicating, by the first system, a log-in status request message to at least the third system, the log-in status request requesting the user's log-in status with the third system; and
determining, by the first system, whether the user presently is logged into at least the second online account hosted by at least the third system in at least one presently active user session by receiving from at least the third system a login status message, the log-in status message indicating whether the user presently is logged into at least the second online account hosted by the third system in at least one presently active user session.

9. The first system of claim 6, wherein determining, by the first system, whether the user presently is logged into at least the second online account hosted by at least the third system in at least one presently active user session comprises:
accessing, by the first system, a data structure stored to memory elements, the data structure tracking whether the user presently is logged into at least the second online account; and
determining, by the first system, whether the user presently is logged into at least the second online account hosted by at least the third system in at least one presently active user session by processing data accessed from the data structure.

10. The first system of claim 6, wherein determining, by the first system, whether the user presently is logged into at least the second online account hosted by at least the third system in at least one presently active user session comprises:
periodically polling, by the first system, at least the third system to inquire whether the user presently is logged into at least the second online account hosted by at least the third system; and
receiving, by the first system, status messages indicating whether the user presently is logged into at least the second online account hosted by at least the third system.

11. A computer program product comprising a computer readable storage medium having program code stored thereon, the program code configured to, when executed by a processor, perform operations comprising:
responsive to a user providing at least one authentication credential to a second system during an attempt to log into a first online account hosted by the second system, receiving, by a first system comprising the processor, an authentication approval request from the second system;
responsive to receiving the authentication approval request from the second system, determining, by the first system, whether the user is required to be logged into at least a second online account hosted by at least a third system unrelated to the second system in order to approve the authentication approval request;

responsive to determining that the user is required to be logged into at least the second online account hosted by at least the third system in order to approve the authentication approval request, determining, by the first system, whether the user presently is logged into at least the second online account hosted by at least the third system in at least one presently active user session; and responsive to determining that the user presently is logged into at least the second online account hosted by at least the third system in at least one presently active user session, communicating to the second system a response to the authentication approval request indicating that the user is approved for authentication with the second system to log into the first online account hosted by the second system;

responsive to the user providing at least one authentication credential to a fourth system during an attempt to log into a third online account hosted by the fourth system, receiving, by the first system, a second authentication approval request from the fourth system;

responsive to receiving the second authentication approval request from the fourth system, determining, by the first system, whether the user is required to be logged into at least a fourth online account hosted by at least a fifth system unrelated to the fourth system in order to approve the second authentication approval request;

responsive to determining that the user is required to be logged into at least the fourth online account hosted by at least the fifth system in order to approve the authentication approval request, determining, by the first system, whether the user presently is logged into at least the fourth online account hosted by at least the fifth system in at least one presently active user session; and responsive to determining that the user presently is not logged into at least the fourth online account hosted by the at least the fifth system in at least one presently active user session, communicating to the fourth system a response to the authentication approval request indicating that the user is not approved for authentication with the fourth system to log into the third online account hosted by the fourth system.

12. The computer program product of claim 11, wherein determining, by the first system, whether the user is required to be logged into at least a second online account hosted by at least a third system unrelated to the second system in order to approve the authentication approval request comprises:

determining whether the user is required to be logged into at least a second online account hosted by at least a third system unrelated to the second system in order to approve the authentication approval request by accessing, by the first system, log-in rules established for the user and processing, by the first system, the log-in rules.

13. The computer program product of claim 11, wherein determining, by the first system, whether the user presently is logged into at least the second online account hosted by at least the third system in at least one presently active user session comprises:

communicating, by the first system, a log-in status request message to at least the third system, the log-in status request requesting the user's log-in status with the third system; and determining, by the first system, whether the user presently is logged into at least the second online account hosted by at least the third system in at least one presently active user session by receiving from at least the third system a login status message, the log-in status message indicating whether the user presently is logged into at least the second online account hosted by the third system in at least one presently active user session.

14. The computer program product of claim 11, wherein determining, by the first system, whether the user presently is logged into at least the second online account hosted by at least the third system in at least one presently active user session comprises:

accessing, by the first system, a data structure stored to memory elements, the data structure tracking whether the user presently is logged into at least the second online account; and determining, by the first system, whether the user presently is logged into at least the second online account hosted by at least the third system in at least one presently active user session by processing data accessed from the data structure.

15. The computer program product of claim 11, wherein determining, by the first system, whether the user presently is logged into at least the second online account hosted by at least the third system in at least one presently active user session comprises:

periodically polling, by the first system, at least the third system to inquire whether the user presently is logged into at least the second online account hosted by at least the third system; and receiving, by the first system, status messages indicating whether the user presently is logged into at least the second online account hosted by at least the third system.

* * * * *